Oct. 6, 1964   W. R. KING   3,151,523
PHOTOGRAPHIC PROJECTOR
Filed June 20, 1961

INVENTOR.
WILLIAM R. KING
BY
ATTORNEY

United States Patent Office 3,151,523
Patented Oct. 6, 1964

3,151,523
PHOTOGRAPHIC PROJECTOR
William R. King, Denver, Colo., assignor to
Honeywell Inc., a corporation of Delaware
Filed June 20, 1961, Ser. No. 118,340
10 Claims. (Cl. 88—28)

The present invention is concerned with an improved photographic projector and particularly with an automatic photographic projector whose operation is controlled by an electric drive motor, the drive motor providing means, upon energization of the drive motor, to control the slide changing mechanism of the projector through a cycle of operation wherein a slide is moved from a projection compartment within the projector to a slide storage tray, the slide storage tray is indexed, and a further slide is then returned to the projection compartment for display on a screen or the like.

Automatic projectors of this type are well known in the prior art and the present invention is directed to a means in which the motor of such a projector is controlled in a new and a unique manner. Specifically, the present invention provides a means whereby a remote control unit selectively provides either random slide changing under the control of the operator, or timed slide changing at various timed intervals. The structure of the present invention facilitates both random and variable timed changing at the remote position.

This is accomplished by utilizing a timer situated at the projector, the timer being controlled by switch means located at the remote position. Furthermore, the present invention provides this versatile control of the automatic projector by means of an electrical construction which, even though the motor of the projector is a relatively high current motor, utilizes only low magnitude currents at the remote position. Thus, safe operation is achieved since it is not necessary to provide the switching of dangerously high currents at the remote position, it being recognized that the remote position includes a handle member to be held by the operator. As is readily appreciated, by the use of proper electrical insulation, a high current remote switching unit is possible. However, the present invention allows the use of a relatively inexpensive and lightweight remote unit since the current being switched is a low magnitude current.

Figure 1:
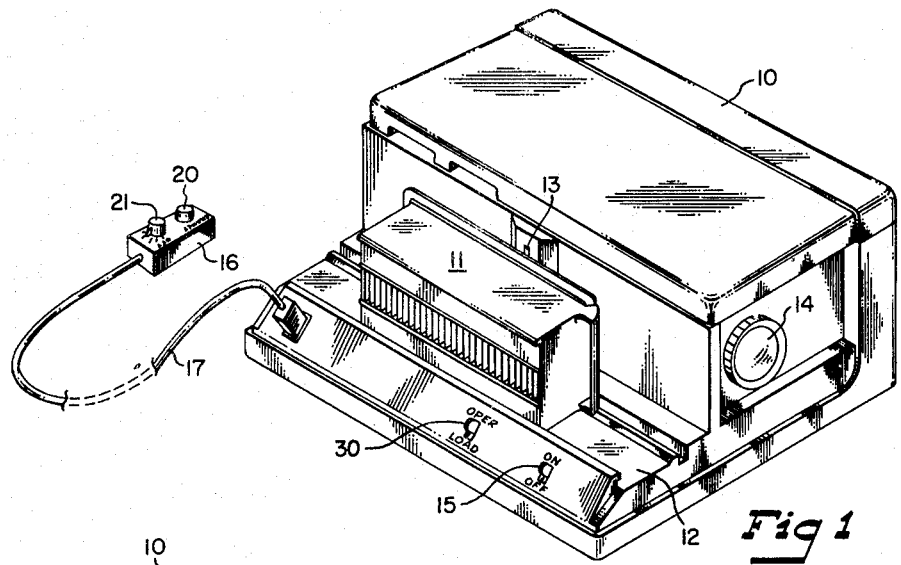
Figure 2:
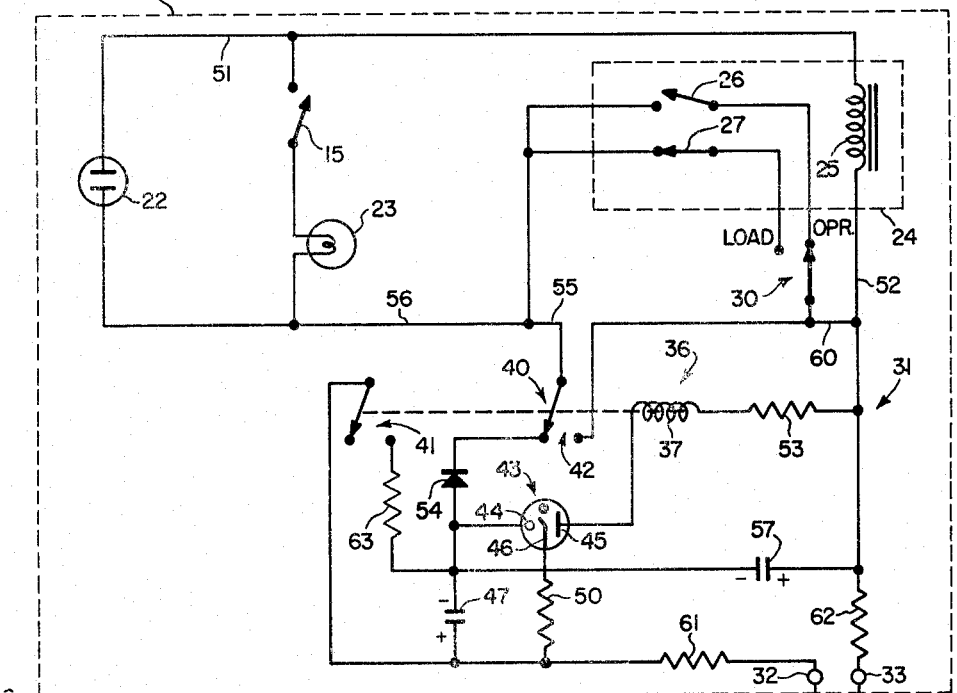

The present invention will be apparent to those skilled in the art upon reference to the following specification, claims, and drawings, of which:

FIGURE 1 is a perspective view of an automatic projector of the general type which embodies the present invention, and FIGURE 2 is a schematic representation of the circuit of the projector of FIGURE 1, showing the electrical features of the present invention.

Referring specifically to FIGURE 1, reference numeral 10 designates the housing of an automatic projector having a slide storage tray 11 mounted on a slide receiving platform 12. The slide storage tray 11 is adapted to store a number of individual photographic slides, for example 30, which are adapted to be selectively moved through a slide receiving window 13 into a projection compartment in alignment with an optical axis including an objective lens 14. Thus, in a manner well known, the slide, when disposed in the projection compartment, is displayed on a screen or the like.

The projector of FIGURE 1 is a projector generally characterized in the art as an automatic projector. As thus characterized, such a projector is provided with an electric motor which has a rest position wherein a slide is positioned at the projection compartment and is displayed on a screen or the like. When it is desired to change the slide, a cycle of operation is initiated for the motor and this is usually accomplished by a momentary push button to complete an initial energizing circuit for the motor. This initial energizing circuit is shunted by a maintaining circuit including a maintaining switch of the motor to insure that the motor completes a cycle of operation. During the first portion of the cycle of operation the slide which has been disposed within the projection compartment of the projector is returned to the slide storage tray 11. The slide storage tray is then indexed or moved to move a succeeding slide into alignment with the slide receiving window 13. The slide changing means is then effective to return this succeeding slide to the projection compartment within the projector to thereby complete the cycle of operation and to move this further slide into a position where it is now displayed on the screen.

The projector of FIGURE 1 is provided with a master on-off switch 15 and an operate-load switch 30. The control of the operational sequence of the projector is achieved by means of a remote control unit 16 which is connected to the projector by means of a two conductor cord 17. The remote control unit 16 includes a change push button switch 20 as well as a timer control member 21, this timer control member 21 facilitating timed changing of the projector, as will be described.

A projector of the general type above described can be found, for example, in the William R. King U.S. Patent 2,998,750.

Referring now to FIGURE 2, this figure shows the electrical circuitry embodied within the projector of FIGURE 1 and it is the characteristic of this electrical circuitry, cooperating with the automatic type photographic projector, which embodies the principles of the present invention. Reference numeral 22 designates an electrical outlet, not shown in FIGURE 1, which is adapted to be connected to a source of alternating voltage, for example, the 110 volt 60 cycle source of voltage normally available. The on-off switch 15 is shown connected in circuit with a projection lamp 23, this projection lamp being located within the housing 10 generally in alignment with the objective lens 14 to produce the illumination for projecting the slide located within the projection compartment of the projector, in the conventional manner.

Reference numeral 24 designates generally a drive motor having an actuating winding 25 and controlling a normally open switch 26 and a normally closed switch 27 respectively. The mechanical construction of motor 24 is not shown since it is within the teachings of the present invention that this invention be utilized with any of the well known forms of automatic projectors wherein the drive motor provides the mechanical driving force to move the members of the slide changing mechanism and the slide tray indexing mechanism incorporated in such projectors. Specifically, drive motor 24 is constructed and arranged so as to close switch 26 upon initial movement of the drive motor from its rest position, the rest position being the position in which a slide is positioned at the projection compartment of the projector. Thereafter, the slide is first returned to the slide storage tray 11, in the manner above described. Switch 26 remains in the closed position and is opened only upon motor 25 again returning to its rest position, the return movement returning a further slide to the projection compartment of the projector. Switch 27 on the other hand is closed, but is opened as soon as the slide has been returned from the projection compartment of the projector to the slide tray. As will be more completely described, this construction provides a means of stopping the operation of the automatic projector with all of the slides returned to the slide storage tray to facilitate removal of the tray, if desired. This general functioning of an automatic projector is well known and may be achieved in different manners, as shown in the prior art.

Reference numeral 30 discloses a "load-operate" switch which, as seen in FIGURE 2, in the operate position allows the drive motor 24 to be controlled through a complete cycle of operation under the control of switch 26. When switch 30 is placed in a load position, then the drive motor 24 is connected under the control of switch 27 and is stopped, as above described, when the slide has been returned to the slide storage tray 11 to thereby facilitate removal of this tray with all of the slides in their respective positions within the tray.

Reference numeral 31 designates generally an electrical means which includes a pair of terminals 32 and 33 adapted to be connected by two conductor remote cord 17 to terminals 34 and 35 of the remote control 16, the remote control 16 including the change switch 20 and the timer control 21. The electrical means 31 includes a relay 36 having a winding 37, normally closed relay switch 40, normally open relay switch 41 and normally open relay switch 42. In the conventional manner, switch 40 is opened when the relay winding is energized and switches 41 and 42 are closed when the relay winding is energized.

Relay winding 37 is connected in circuit with a controllable current conducting device in the form of a gas tube 43 having a pair of main current conducting electrodes 44 and 45 and a control electrode 46. Electrodes 44 and 45 constitute output electrodes whereas electrodes 44 and 46 constitute input electrodes. The input electrodes 44 and 46 are connected to a control means in the form of a capacitor 47 and a resistor 50. The control of device 43 is achieved in a manner to be described.

If it is assumed for the moment that discharge device 43 is conductive, a current flow circuit can be traced from electrical outlet 22 through conductor 51, motor winding 25, conductor 52, resistor 53, relay winding 37, electrodes 44 and 45 of device 43, diode 54, normally closed switch 40 of relay 36, and conductors 55 and 56 to the electrical outlet 22. Thus, relay winding 37 is initially energized. Energization of this winding causes switch 40 to open and switch 42 to close. As will be described, relay winding 37 is maintained energized for a time period by means of a circuit including a capacitor 57. Thus, while the initial energizing circuit is broken at switch 40, the normally open switches 41 and 42 are maintained in their closed position for this period of time. The closing of switch 42 completes an energizing circuit for drive motor 25, this circuit being traced from conductor 51 through the drive motor, conductor 60, switch 42, and conductors 55 and 56. As has been described, the initial rotation or movement of drive motor 24 causes switch 26 to close and a shunt circuit is now completed around the switch 42, this shunt circuit including switch 30 in the operate position and switch 26 in a series circuit. Thus, it is seen from the above description that the energization of drive motor 24 is controlled by the conduction of device 43.

The manner in which device 43 is controlled will now be described. The control of this device includes capacitor 57 which is charged to a polarity indicated by means of a circuit which can be traced from conductor 51 through motor 24, conductor 52, capacitor 57, diode 54, switch 40, and conductors 55 and 56.

Capacitor 57 is connected in series with capacitor 47 and isolation resistors 61 and 62 to the terminals 32 and 33. Resistors 61 and 62 function as current limiting resistors to isolate the voltage on capacitor 57 from the remote unit 16. In a particular embodiment of the present invention resistors 61 and 62 each had a resistance value of 100,000 ohms.

If it is assumed now that the operator of the projector desires to change a single slide, the change switch 20 is closed. A circuit can now be traced from the positive terminal of capacitor 57 through resistor 62, terminals 33 and 35, switch 20, terminals 34 and 32, resistor 61, and capacitor 47 to the negative plate of capacitor 57. By virtue of this circuit, capacitor 47 is charged with only resistors 61 and 62 as limiting factors, such that the lower plate of this capacitor, which is connected through resistor 50 to the control electrode 46 of device 43, is positive. Capacitor 47 is selected such that substantially immediately the device 43 is rendered conductive by virtue of the positive voltage on its control electrode 46. Furthermore, the above traced circuit which charged capacitor 47 is constructed and arranged such that the current flowing through the change switch 20 at the remote unit 16 is a very low current, for example 5 milliamps. Thus, since there is very little hazard in switching of such a low magnitude current, the wire in the remote cord 17 and the construction of the remote unit 16 can be relatively inexpensive and light weight.

Conduction of device 43 energizes relay winding 37 in the manner above described. Furthermore, the conduction of discharge device 43 completes a circuit allowing capacitor 57 to discharge through relay 37, it being remembered that energization of relay 36 opens switch 40. The discharging circuit for capacitor 57 can be traced from the positive plate of this capacitor through resistor 53, winding 37, and electrodes 44 and 45 to the negative plate of this capacitor. Thus, relay winding 37 is maintained in an energized state for a period of time sufficient for drive motor 24 to close its switch 26 to maintain a holding circuit for the drive motor such that the drive motor will complete its cycle of operation.

Energization of winding 37 also causes switch 41 to move to a closed position. The closing of this switch completes a shunt circuit around capacitor 47, the shunt circuit including a resistor 63. Thus, energization of winding 37 is effective to discharge capacitor 47, restoring this capacitor to its discharged state for the next cycle of operation, which may be initiated either by virtue of the change switch 20 or by virtue of the timing control member 21, as will now be described.

If the operator of the projector desires to sequentially show the slides disposed in the slide storage tray 11 at a regular timed interval, the timing control 21 may be moved to one of a number of positions. For example, in FIGURE 2 the means 21 is shown as a switch having four positions, one of these being an off position and the other three being associated with three resistors 64, 65, and 66. These resistors are of different values and thus provide different charging times for capacitor 47 to control the timing of the slide changing. In a particular embodiment of the present invention, resistor 64 has been selected as a 12 megohm resistor, resistor 65 as a 22 megohm resistor, and resistor 66 as a 33 megohm resistor. Thus, it can be seen that the magnitude of these resistors is relatively high when compared to that of isolation resistors 61 and 62. Resistors 61 and 62 function to limit the current flowing to the remote unit 16 but do not appreciably affect the timing of the slide changing. If switch 21 is moved to one of its three operative positions, for example, into engagement with the terminal connected to resistor 64, then a charging circuit for capacitor 47 can be traced from the positive terminal of capacitor 57 through resistor 62, switch 21, resistor 64, resistor 61, and capacitor 47 to the negative terminal of capacitor 57. Thus, capacitor 47 is again charged in the manner above described. However, in this case the charging rate of capacitor 47 has been decreased by virtue of the relatively high magnitude resistor 64 which is now connected in the charging circuit. After a timed period, normally in the range of seconds, device 43 is rendered conductive as above described. The drive motor 24 is thereby energized to complete the cycle of operation. At the end of the cycle of operation switch 40 is again closed and capacitor 57 is recharged. Since switch 21 of remote unit 16 remains closed, as distinguished from momentary action of the push button change switch 20, capacitor 47 is again charged through the above traced circuit including resistor 64. Therefore, after a timed interval, device 43 is again rendered conductive and the changing cycle is repeated. Furthermore, this cycle repeats at a regular timed rate so long as switch 21 remains in operative position to connect resistor 64 in a charging circuit. If a longer time period is desired, then switch 21 is moved into engagement with the terminal connected to resistor 65. The terminal connected to resistor 66 provides still a greater timed interval. As has been described, each cycle of energization of relay 36 closes its switch 41 to discharge capacitor 47 and condition this capacitor for a recharging to thus provide consistent and reliable timing since capacitor 47 in all cases performs this timing function starting from a discharge condition.

It will be noted that during the automatic timing, switch 20 can be closed to override the switch 21 and change to the next slide. When this is done the capacitor 47 is discharged to zero by relay contact 41 so the new incoming slide will have full showing time.

From the above description it can be seen that I have provided an improved photographic projector, and particularly a means of controlling an automatic type photographic projector wherein a remote unit 16 is provided to selectively change the slides at a random rate at the option of the operator by virtue of change switch 20, or to provide timed changing by virtue of the switch means 21. Furthermore, this remote switching is accomplished in a low current circuit by virtue of isolation resistors 61 and 62 to thus control a relatively high current drive motor 24 by switch means (20–21) controlling a low magnitude current.

Other modifications of the present invention will be apparent to those skilled in the art and it is therefore intended that the scope of the present invention be limited solely by the scope of the appended claims.

I claim as my invention:

1. In an electric photographic slide projector having an electric motor, movable slide changing means operable to move through a cycle of operation wherein a slide is moved from a projection position to a slide storage tray and a different slide is then returned to the projection position for display on a screen or the like, and means operably connecting said motor to said slide changing means to drive the same upon energization of said motor, the improvement comprising; remotely controlled electric circuit means within the projector for selectively controlling said motor to effect slide changing at the discretion of the operator or to effect slide changing at a regular timed interval, said circuit means including a timer positioned at the projector having a controllable current conducting device with main current conducting path means connected in series with said motor; and remote control means including switch means connected in controlling relation to said current conducting device, said switch means having a plurality of positions to selectively effect conduction of said current conducting device as determined by actuation of said switch means by the operator or to effect conduction of said current conducting device at a regular timed interval.

2. In an electric photographic slide projector having an electric motor which, upon energization thereof, is operative to effect movement of a photographic slide from a projection position to a slide storage tray and to then effect movement of a different slide to the projection position for display on a screen or the like, whereupon the electric motor is de-energized upon the completion of a cycle of operation, the improvement comprising; remote controlled electric circuit means within the projector for selectively controlling said motor to effect slide changing at the discretion of the operator or to effect slide changing at a regular timed interval, said remote controlled circuit means including a controllable current conducting device having a main current conducting path which includes means capable of conducting a relatively high current, including circuit means connecting the main current conducting path in series with said motor to effect energization of said motor when said current conducting device is rendered conductive, annd including control means for said current conducting device; and remote control means including means connected in controlling relation to the control means of said remote controlled circuit means, said remote control means having means to selectively effect conduction of said current conducting device as determined by the operator or to effect conduction of said current conducting device at a regular timed interval.

3. In an electric photographic slide projector having a high voltage electric motor operatively connected to slide changing means and effective when energized to drive the slide changing means through a cycle of operation wherein a slide is moved from a projection position to a slide storage tray and a different slide is then returned to the projection position for display on a screen or the like, the improvement comprising; remotely controlled electric circuit means within said projector for selectively controlling the motor to selectively effect slide changing or to effect slide changing at a regular timed interval by means of remote switching means, said circuit means including a timer having a controllable current conducting device with a main current conducting path with means connected in series with said motor capable of conducting a relatively high magnitude current, including means to connect said series connected motor and current conducting device to a source of high voltage, including an electrical timing network connected to the source of high voltage, including means connecting the electrical timing nework in controlling relation to said current conducting device to initiate conduction of said current conducting device, including isolating resistor means connecting said timing network to said terminal means; and remote control means connected to said terminal means and including switch means having a plurality of positions to selectively effect conduction of said current conducting device as said switch means is actuated or to effect conduction of said current conducting device at a regular timed interval, said isolating resistor means serving to effect such control of said current conducting device by means of a relatively low magnitude current flowing to said remote control means.

4. An electric photographic slide projector comprising: an electric motor, slide changing means operative to provide a cycle of operation wherein a slide is moved from a projection compartment to a slide storage tray and a further slide is then returned to the projection compartment to complete said cycle of operation, means operatively connecting said motor to said slide changing means, a source of voltage, a capacitor, circuit means connecting said capacitor to said source of voltage to charge the same, controllable current conducting means having a main current conducting path including means to establish a circuit connecting said electric motor to said source of voltage upon conduction of said current conducting means, remote control means including a plurality of resistance means and switch means, and means connecting said remote control means to said capacitor and in controlling relation to said controllable current conducting means to thereby utilize the charge on said capacitor to render said current conducting means conductive, said remote control means being constructed and arranged to selectively provide single slide changing or timed slide changing under the control of said switch means.

5. An electric photographic slide projector comprising; a high current electric motor, slide changing means connected to be driven by said electric motor and operative to provide a cycle of operation wherein a slide is moved from a projection compartment to a slide storage tray and a further slide is then returned to the projection compartment to complete said cycle of operation, a source of voltage, a first and a second capacitor, circuit means connecting said first capacitor to said source of voltage to charge the same, controllable current conducting means having a main current conducting path including means to establish a circuit connecting said electric motor to said source of voltage upon conduction of said current conducting means, remote control means including a plurality of resistance means and switch means, circuit means including said remote control means connecting said second capacitor to said first capacitor to thereby charge said capacitor at a rate determined by the position of said switch means, circuit means connecting said second capacitor in controlling relation to said controllable current conducting means to utilize the charge on said second capacitor to render said current conducting means conductive, said remote control means being constructed and arranged to selectively provide single slide changing or timed slide changing under the control of said switch means.

6. In combination with an electrical network for use to control the slide changing of an electrical automatic photographic projector having a motor, a relay having a winding and a normally open switch, a controllable current conducting device having output electrodes and control electrodes, circuit means connecting said relay winding and said output electrodes in circuit to a source of voltage to thereby energize said winding upon said conducting device being rendered conductive, a capacitor connected to said control electrodes, a remote control unit having a plurality of switch means, each of which is associated with impedance means of a different magnitude, circuit means controlled by said remote control unit connected to said capacitor to charge said capacitor at a rate determined by the magnitude of said impedance means to thereby provide a timed energization of said relay winding, and a motor circuit to be closed by said relay normally open switch.

7. In combination with an electrical network for use to control the slide changing of an electrical automatic photographic projector having a motor, a relay having a winding and a pair of normally open switches, a controllable current conducting device having output electrodes and control electrodes, circuit means connecting said relay winding and said output electrodes in circuit to a source of voltage to thereby energize said winding upon said conducting device being rendered conductive, a capacitor connected to said control electrodes, a remote control unit having a plurality of switch means each of which is associated with impedance means of a different magnitude, circuit means controlled by said remote control unit connected to said capacitor to charge said capacitor at a rate determined by the magnitude of the associated impedance means to thereby provide a timed energization of said relay winding, a projector motor circuit to be closed by one of said relay normally open switches, and a circuit including the other of said normally open switches for shunting said capacitor to thereby discharge said capacitor upon energization of said relay winding.

8. In combination with an electrical network for use to control the slide changing of an electric automatic photographic projector having a motor, a relay having a winding, a normally closed switch, and a pair of normally open switches, a controllable current conducting device having output electrodes and control electrodes, circuit means including in series said relay normally closed switch, said relay winding and said output electrodes to energize said winding upon said conducting device being rendered conductive, a first capacitor, a source of voltage, circuit means including said normally closed switch connecting said first capacitor to said source of voltage to thereby charge the same, a second capacitor connected to said control electrode, a remote control unit having a plurality of switch means, one of which provides a direct circuit connection and the others of which provide circuit connections including impedance means of different magnitudes, circuit means controlled by said remote control unit connecting said second capacitor to said first capacitor to thereby charge said second capacitor at a rate determined by the magnitude of the impedance of the associated circuit connection, circuit means including said relay first normally open switch to energize a projector motor crcuit to facilitate slide changing of the automatic projector, and further circuit means controlled by said relay second normally open switch to discharge said second capacitor upon the energization of said relay winding to thereby restore said second capacitor to a discharged state.

9. An automatic photographic projector comprising; an electric drive motor, slide changing means operably connected to said drive motor and effective to be moved through a cycle of operation upon energization of said drive motor wherein a slide is moved from a projection compartment to a slide storage tray and a further slide is returned to the projection compartment to be projected on a screen or the like, a normally open motor switch to be closed upon initial movement of the drive motor, a relay having a winding, a normally closed relay switch, and a first and second normally open relay switch, a controllable current conducting device having a pair of main current conducting electrodes and a pair of control electrodes, circuit means incuding said main current conducting electrodes and said normally closed relay switch to connect said relay winding to a source of voltage to thereby energize said winding upon said current conducting device being rendered conductive, a first capacitor, circuit means including said normally closed relay switch to charge said first capacitor, a second capacitor, circuit means connecting said second capacitor to said control electrodes, a circuit controlled by said first normally open relay switch to shunt said second capacitor upon energization of said relay winding, current limiting impedance means, circuit means connecting said current limiting impedance means and said first and second capacitor to remote control terminals on said projector, a remote control unit having a two conductor cord connected to said remote control terminals, said remote control unit being provided with a first remote control switch means adapted to provide a direct connection between said remote control terminals to thereby substantially immediately charge said second capacitor from said first capacitor and render said current conducting device conductive, whereupon said relay winding is energized to thereupon discharge said second capacitor, circuit means controlled by the second normally open switch of said relay to complete an initial energizing circuit for said drive motor, said remote control unit including second remote control switch means having an open switch position and a plurality of other switch positions each of which is operative to connect an impedance means of a different magnitude across said remote control terminals to thereby provide a timed charging of said second capacitor from said first capacitor to produce periodic energization of said relay at a timed interval depending upon the magnitude of said last named impedance means.

10. In an automatic photographic projector having a high current drive motor to control slide changing means and having remote switching means to control the drive motor, the switching means being constructed and arranged to selectively change slides at the discretion of the operator or to change the slides at a timed interval, the slide changing being accomplished at a remote position by the control of a relatively low magnitude current, the projector comprising; an electrical outlet to be connected to a source of alternating voltage, a drive motor, a relay having a normally closed relay switch and first and second normally open relay switches, a gas discharge device having a pair of main current conducting electrodes and a pair of control electrodes, a diode, circuit means connecting in series with said drive motor, said relay winding, the main current conducting electrodes of said gas discharge device, said diode and said normally closed relay switch to said electrical outlet, said series circuit conducting current upon said discharge device being rendered conductive, a first capacitor, circuit means including said diode and said normally closed relay switch connecting said first capacitor to said outlet to thereby charge said first capacitor, a second capacitor, circuit means connecting said second capacitor to the input electrodes of said gas discharge device to render said gas discharge device conductive upon said second capacitor being charged, a first pair of terminals mounted on said projector, isolating resistor means, circuit means connecting said isolating resistor means, said first capacitor, and said second capacitor in a series circuit to said first pair of terminals, a remote control unit having a second pair of terminals, a first remote control unit switch directly connected across said second pair of terminals, a second remote control unit switch having a plurality of positions in each of which an impedance means of different magnitude is connected across said second pair of terminals, a two conductor cord connecting said first pair of terminals to said second pair of terminals, said remote control unit thereby facilitating the charging of said second capacitor from said first capacitor, the charging rate being determined by the impedance in the charging circuit, said remote control unit thereby facilitating the instantaneous changing of the slides by virtue of the first remote control unit switch or the variable timed changing of said slides by virtue of the second remote control unit switch under the control of the operator, circuit means controlled by said first normally open relay switch completing an initial energizing circuit for said drive motor, a drive motor switch closed upon initial movement of said drive motor, circuit means connecting said drive motor switch in parallel with said first normally open relay switch, and a second circuit including impedance means and controlled by said second normally open relay switch connected to discharge said second capacitor upon energization of said relay winding.

References Cited in the file of this patent

UNITED STATES PATENTS

| | | |
|---|---|---|
| 2,949,814 | Boughton et al. | Apr. 23, 1960 |
| 2,986,968 | Kropp et al. | June 6, 1961 |